United States Patent
Aihara et al.

(10) Patent No.: US 6,678,834 B1
(45) Date of Patent: Jan. 13, 2004

(54) APPARATUS AND METHOD FOR A PERSONAL COMPUTER SYSTEM PROVIDING NON-DISTRACTING VIDEO POWER MANAGEMENT

(75) Inventors: Toru Aihara, Yokohama (JP); Sanehiro Furuichi, Kawasaki (JP); Hiroshi Ishikawa, Shizuoka (JP); Noboru Kamijo, Fujisaw (JP); Kazuo Sekiya, Tokyo-to (JP); Susumu Shimotono, Hadano (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/270,416

(22) Filed: Mar. 16, 1999

(30) Foreign Application Priority Data

Mar. 20, 1998 (JP) ............................ 10-071830

(51) Int. Cl.⁷ .............................. G06F 1/04; G09G 5/00
(52) U.S. Cl. ....................... 713/501; 713/500; 345/212
(58) Field of Search ................................ 713/300, 322, 713/324, 500, 501; 345/87, 89, 98, 212

(56) References Cited

U.S. PATENT DOCUMENTS

| | | | |
|---|---|---|---|
| 5,524,249 A | | 6/1996 | Suboh |
| 5,537,650 A | * | 7/1996 | West et al. ................. 713/324 |
| 5,548,765 A | * | 8/1996 | Tsunoda et al. ............ 713/322 |
| 5,615,376 A | | 3/1997 | Ranganathan |
| 5,619,707 A | * | 4/1997 | Suboh ........................ 713/322 |
| 5,739,802 A | * | 4/1998 | Mosier ........................ 345/89 |
| 5,818,419 A | | 10/1998 | Tajima et al. |
| 5,822,599 A | * | 10/1998 | Kidder et al. ............... 713/324 |
| 5,886,689 A | * | 3/1999 | Chee et al. ................. 345/212 |
| 5,952,991 A | * | 9/1999 | Akiyama ..................... 345/98 |
| 5,991,883 A | * | 11/1999 | Atkinson .................... 713/300 |
| 6,232,937 B1 | * | 5/2001 | Jacobsen et al. ............. 345/87 |
| 6,476,800 B2 | * | 11/2002 | Millman et al. ............. 345/212 |

FOREIGN PATENT DOCUMENTS

| | | |
|---|---|---|
| JP | 05-053543 | 3/1993 |
| JP | 05-273950 | 10/1993 |
| JP | 06-019592 | 1/1994 |
| JP | 06-118928 | 5/1994 |
| JP | 06-342148 | 12/1994 |
| JP | 07-005864 | 1/1995 |
| JP | 07-064665 | 3/1995 |
| JP | 07-140933 | 6/1995 |
| JP | 07-239463 | 9/1995 |

(List continued on next page.)

*Primary Examiner*—Thomas Lee
*Assistant Examiner*—Chun Cao
(74) *Attorney, Agent, or Firm*—Carlos Munoz-Bustamonte; George E. Grosser

(57) ABSTRACT

To change the frequency of a video clock without adversely affecting a display quality. To lower the frequency of a video clock, following steps are executed, detecting an opportunity which causes the reduction of the frequency of the video clock; lowering the frequency of the video clock in a frequency range within which a circuit employing the video clock (for example, a PLL (Phase Lock Loop) circuit) can follow a change in the frequency; and iterating the step of lowering the frequency of the video clock until a predetermined frequency is attained. In addition, the following steps are also performed, detecting an opportunity which causes the reduction of the frequency of the video clock; lowering the frequency of the video clock to a predetermined frequency during a vertical blanking interval of a display device that employs the video clock; and maintaining the predetermined frequency of the video clock until change of the frequency is required. Furthermore, the following steps are performed, detecting an opportunity which causes the reduction of the frequency of the video clock; changing a display color on a screen of a display device to a color for which flickers are not outstanding; and lowering the frequency of the video clock.

5 Claims, 6 Drawing Sheets

FOREIGN PATENT DOCUMENTS

| | | |
|---|---|---|
| JP | 08-018819 | 1/1996 |
| JP | 08-179269 | 7/1996 |
| JP | 08-263466 | 10/1996 |
| JP | 09-005789 | 1/1997 |
| JP | 09-006459 | 1/1997 |
| JP | 09-128092 | 5/1997 |
| JP | 09-160520 | 6/1997 |
| JP | 09-160521 | 6/1997 |
| JP | 09-198016 | 7/1997 |
| JP | 09-265275 | 10/1997 |
| JP | 09-274200 | 10/1997 |
| JP | 09-282042 | 10/1997 |
| JP | 09-284614 | 10/1997 |
| JP | 09-319472 | 12/1997 |
| WO | WO 98/06022 | 2/1998 |

* cited by examiner

APPARATUS AND METHOD FOR A PERSONAL COMPUTER SYSTEM PROVIDING NON-DISTRACTING VIDEO POWER MANAGEMENT

FIELD OF THE INVENTION

The present invention relates to power management, more particularly to a technique for enabling the power management by lowering the frequency of a video clock (Vclk). The Vclk is a timing signal for displaying on a display device, and includes, for example, a timing signal for outputting display data to an LCD (liquid crystal display) for each pixel.

BACKGROUND ART

A technique that is currently employed to reduce the power consumed by electronic circuits involves lowering the frequency of a clock, or halting the clock. Since in recent practice there has been an increase in the power consumed by a CPU (central processing unit), the clock frequency is lowered, or halted, in accordance with the amount of processing required for the CPU. The frequency of a video clock, as it is related to a display device such as an LCD, tends to increase with the resolution and the number of display colors, and accordingly, this causes an increase in the power consumption. However, since lowering the frequency of the video clock causes flickers and deterioration of display quality, it is not employed in normal display devices.

Techniques that are employed to lower the frequency of the video clock, or to reduce the refresh rate of the display device are given hereinafter. It should be noted that reducing the refresh rate is not equivalent to lowering the frequency of the Vclk. The refresh rate can be reduced by extending the horizontal or vertical blanking interval while maintaining the Vclk frequency, or by lowering the Vclk frequency, which is the clock frequency on which all the clocks associated with the display are based, without altering the number of clocks used during a horizontal/vertical blanking interval. Lowering the frequency of the Vclk is an effective means to reduce the power consumption, however, in the present invention, it is used to reduce the refresh rate.

U.S. Pat. No. 5,524,249 discloses a technique for halting. When the supply of power to a display device is halted, a Pclk (substantially the same as a video clock) provides for the lowering the frequency of an Mclk (memory clock: a drive frequency of a video controller) when the supply of the power to a display device is halted in such a suspended state or a standby state. However, there is no description about the manner that the Pclk is lowered or halted during the normal state other than the power saving mode, such as the suspended state or the standby state, and that the Pclk and Mclk are simultaneously lowered in the normal state.

U.S. Pat. No. 5,615,376 discloses a technique for halting a VCLK (video clock) during the horizontal and vertical blanking intervals and for lowering an MCLK when there is no access to the frame buffer. However, no description is given for a technique for lowering the VCLK during a normal display period, and for simultaneously lowering the VCLK and the MCLK in the normal state.

Japanese Unexamined Patent Publication No. Hei 7-64665 discloses a technique for slowing the display timing for an LCD when no data has been written to a display memory for a predetermined period of time and the stored contents have not been changed, if a power voltage drop has been detected, or if the system has fallen into the sleep state. However, no description is given for countermeasures to be taken when flickers occur due to slowing the display timing, and for a technique to be employed to slow the display timing without affecting the display contents.

Japanese Unexamined Patent Publication No. Hei 7-239463 discloses that in an active matrix display device, a refresh operation is performed for several lines (for example, every fourth line in the total of 20 lines) within one frame on the display device, then several frames (four frames, in the above example) are required to refresh the entire screen. In this technique, the above refresh operation is performed as a countermeasure for flickers; however, the effect provided by the operation is inadequate or not satisfactory. In addition, to perform the operation, a circuit provided for a panel must be altered.

Japanese Unexamined Patent Publication No. Hei 6-342148 discloses that in a ferro-electrical liquid crystal display device, only scanning lines in which image data have been altered are refreshed, so that motion picture display such as cursor movement, smooth scrolling, and multi-window, and animated video displays can essentially be performed at high speeds even at the low frame frequency. These operations employ characteristics inherent to the ferro-electrical liquid crystal display device.

Japanese Unexamined Patent Publication No. Hei 9-5789 discloses a technique for lowering the drive frequency of a liquid crystal display device that can rewrite a single pixel arbitrary in the entire pixels. The drive frequency is selected by using a display color, or a motion or a still picture. In addition, it discloses a technique whereby, regardless of whether a still picture or a motion picture is used, the drive frequency is changed in accordance with how much the image to be displayed causes flickers, so that the power consumption is optimized for each display image. The luminance and the display color are also taken into account. However, a special liquid crystal display device that can rewrite a single arbitrary pixel is required.

Japanese Unexamined Patent Publication No. Hei 8-179269 discloses a technique whereby, in order to prevent the occurrence of flicker, data for a positive display having a bright background color and data for a negative display having a dark background color are separately extracted from display data, and the frame frequency of the positive display is raised, while that of the negative display is lowered. However, according to this technique, only two display types, positive and negative, can be identified, and there is no detailed explanation of when the frame frequency should be changed or what method can be used to change it.

SUMMARY OF THE INVENTION

Therefore, the problems identified and addressed by the present invention provide for objectives, which include the goals of changing the frequency of a video clock without affecting a display quality. It is yet another objective of the present invention to lower more so the power consumption.

According to a first aspect of the present invention, a method for lowering a frequency of a video clock, includes the steps of detecting an opportunity which causes a reduction of the frequency of the video clock; lowering the frequency of the video clock in a frequency range within which a circuit employing the video clock (a PLL (phase lock loop) circuit in the embodiment) can follow a change in the frequency; and iterating the step of lowering the frequency of the video clock until a predetermined frequency is attained. As a result, a disarrangement of the display contents due to the disruption of the operation of the PLL circuit and etc. can be prevented.

According to another aspect of the present invention, a method for lowering a frequency of a video clock includes, the steps of detecting an opportunity which causes the reduction of the frequency of the video clock; lowering the frequency of the video clock to a predetermined frequency during a vertical blanking interval of a display device that employs the video clock; and maintaining the predetermined frequency of the video clock until change of the frequency is required. Even for a portable computer that employs an LCD display device, the vertical blanking intervals exist just in case the computer is connected to a CRT. Since no display operation is performed during these intervals, by changing the frequency of the video clock during these intervals power saving can be performed without the display contents being disarranged.

According to a third aspect of the present invention, a method for lowering a frequency of a video clock, includes the steps of detecting an opportunity which causes the reduction of the frequency of the video clock; changing a display color on a screen of a display device to a color for which a flicker is not outstanding; and lowering the frequency of the video clock. Conventionally, a technique for changing a drive frequency based on the display color has been disclosed (Japanese Unexamined Patent Publication No. Hei 9-5789), but according to this technique, the frequency of the video clock is never lowered. That is, in the environment provided by Windows 95 (Trademark of Microsoft Corp.) many display colors are employed for which the flicker will become outstanding when the frequency of the video clock is lowered, so that no power will be saved when the method which is based on the display colors is employed. Therefore, to achieve the low power consumption, before lowering the frequency of the video clock, the colors of a display screen are changed to colors for which the flicker is not outstanding. This method is particularly effective for a portable computer when the remaining battery power becomes low while a relatively static application, such as a word processing program, is being executed.

An opportunity which causes the reduction of the frequency of the video clock can be detected in accordance with the type of application whose window is displayed on a screen of a display device. For example, the opportunity is a case where an application is being executed for which the display contents are not frequently changed, and the window of that application is in the foreground and no window is being displayed for another application whose display contents are frequently changed.

The opportunity which causes the reduction of the frequency of the video clock can be a change in the size of a window displayed on the screen of the display device. If, for example, the window of an application whose display contents are frequently changed is minimized, the frequency of the video clock can be lowered.

Furthermore, the opportunity which causes the reduction of the frequency of the video clock can be a change of an operation frequency of an input device by a user. If, for example, there is frequent manipulation of a mouse or a keyboard by a user, the movement of the mouse cursor, etc., should not cause the stress imposed on the user, and the frequency of the video clock should not be lowered at such a time. However, if the frequency at which data is input using the mouse or the keyboard is at or below a predetermined level, the frequency of the video clock may then be lowered.

In addition, the opportunity which causes the reduction of the frequency of the video clock can be a change of the processing contents of a processor. Normally, if the number of commands executed by the processor is reduced, the degree of alteration of the display screen is also reduced. When this change is detected, the frequency of the video clock can be lowered.

A drive frequency of a video controller can be lowered together with the frequency of the video clock. With some disclosed conventional techniques, lowering the frequency of the Mclk occur at the same time as the video clock is halted; however, this never occurs during a normal display operation. In other words, the conventional technique does not teach lowering the drive frequency of the video controller during a normal display period, which is the main feature of the present invention.

The steps of the processing performed in the present invention have been explained. The present invention can also be implemented by a program or a circuit designed to perform these steps, or by a combination of the two. The program which implements the present invention can be stored on a storage medium such as a CD-ROM or a floppy disk, or in a ROM or etc.

BRIEF DESCRIPTION OF THE DRAWINGS

The objects, features and advantages of the present invention will now be illustrated in more detail by the following detailed description, reference being made to the accompanying drawings in which.

DETAILED DESCRIPTION OF THE PREFERRED EMBODIMENT

Figure 1:
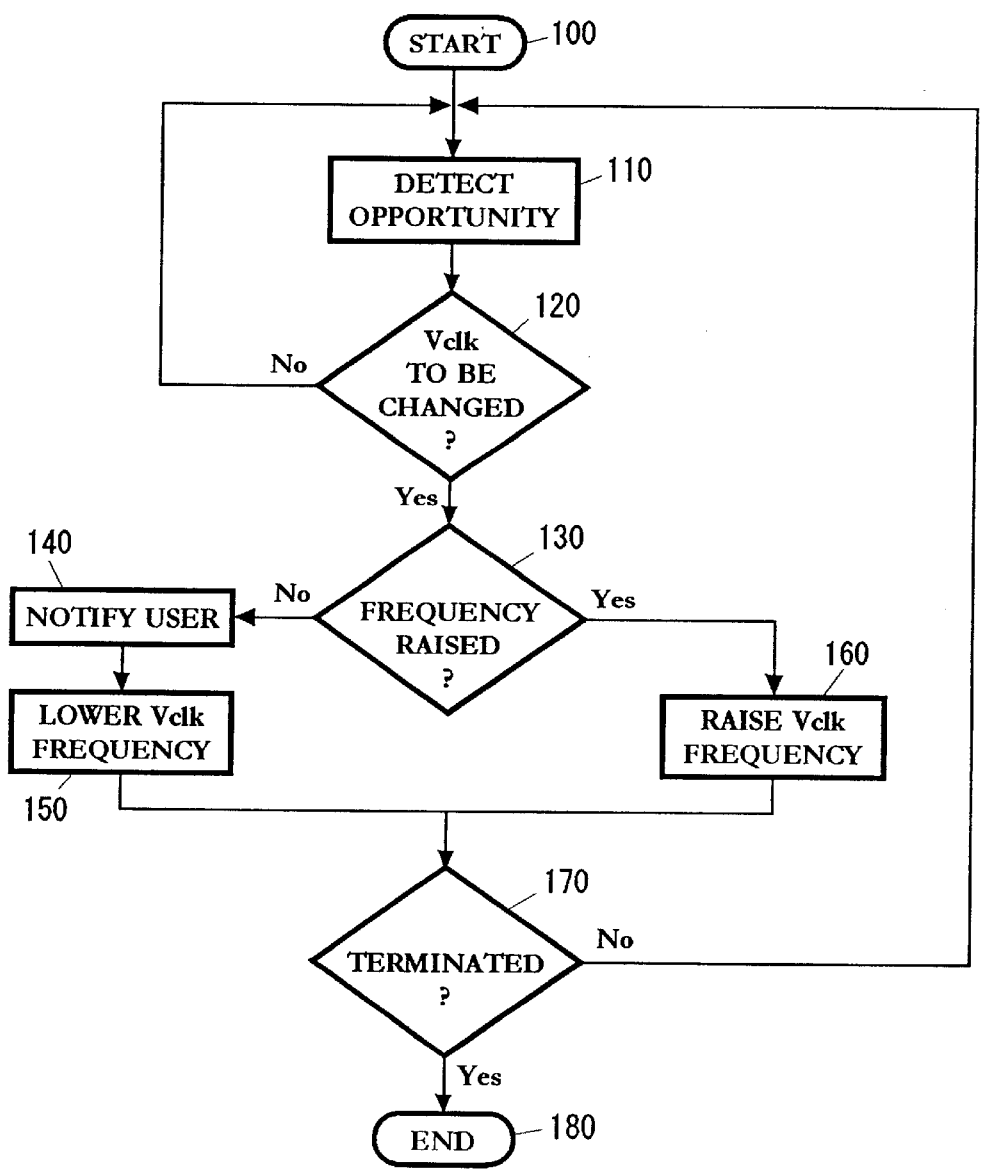
FIG. 1 is a flowchart showing the processing according to the present invention.

For the purposes of review of the figures the following description of the symbols apply: computer 1; processor 3; bus 5; video controller 7; PLL1 9; PLL2 11; bus interface 13; controller 15; LCD output circuit 17; LVDS1 19; PLL3 21; PLL4 23; LVDS2 25; LCD panel 27; frame buffer 29; gate driver 31; and data driver 33.

An example of the processing performed in the present invention will now be explained referring to FIG. 1. This embodiment is an example of the processing performed by a computer in which a currently popular window system is employed. First, an opportunity is detected for changing the frequency of Vclk, see step 110. Specifically, a window message is hooked and examined to detect the activation of an application. The window message is associated with the unit task of an application, which is processed by a window procedure. For example, by using SetWindowsHookEx( ), which is a Window 95 API (Application Programming Interface), a message filter function (a hook function) for performing a specific process in response to a specific message can be introduced into the system. With this function, a message sent to the window procedure (a hook of type WH_CALLWNDPROC) by using SendMessage( ), or a message sent immediately after GetMessage( ) or PeekMessage( ) is called (a hook of type WH-GETMESSAGE) can be monitored. The switching of active windows can be detected by monitoring WM_ACTIVATE message or WM_ACTIVEAPP message.

In this embodiment, the name of an application displayed in a window on a screen is employed to determine whether the frequency of the Vclk should be changed, see step 120. When the frequency of the Vclk is not changed, program control returns to step 110. In Windows 95, the window classes of windows are so defined that they are uniform throughout the system, and the name of an application is easily understood by employing an association table for the window class names and application names. Even in a case where an application name is not registered in the association table because the window is a dialogue box, the application name can be identified by reversely tracing the window inheritance and examining its ancestor's windows. This will be explained in detail later. To examine windows displayed on a desktop, the title of the window or the window class name is checked to ascertain the name of an application. The title of the window can be obtained by using GetWindowText( ) of the API in Windows 95, and the name of the window class can be obtained by using GetClassName( ) of the API. In the second and the subsequent processings, a window message need only be examined to ascertain the application name of a window that has newly been activated or that has been terminated.

If the name of the application is acquired, whether a fast Vclk is required can be determined from the property of the application. That is, while a fast Vclk may be required for an application displaying a game or a video that includes motion pictures, a slow Vclk at which no flicker occurs can be employed for relatively static applications, such as a word processor or a spread sheet. Therefore, as an example, the frequency of the Vclk is defined for each application, and the Vclk for an application that requires the fastest Vclk among window applications to be displayed is employed.

As another example, applications to be executed are categorized in advance into an application group that requires a fast Vclk, and into an application group that requires only a slow Vclk, and if all applications to be displayed are those requiring only the slow Vclk, the frequency of the Vclk is changed to low. But if one of the applications displayed requires the fast Vclk, the fast Vclk is employed. Such a definition can be provided by users, or can be registered in advance by the maker of a computer that is shipped with those applications.

In the above example, the Vclk is specified for each application. However, if identifying an application by using a window class name, and if the application includes several windows or if a child window is generated, a problem arises in that the application can not be identified. At this time, GetWindow( ), or GetParent( ), which is a Windows 95 API, is employed, and a parent window that calls the child window such as a dialogue box can be identified. The application name can be obtained by using the parent window.

If the frequency of the Vclk is to be changed, the frequency can be raised or lowered, and the process differs according to whether it is raised or lowered, see step 130. If a window for displaying motion pictures newly appears on the screen or is moved to the foreground, the frequency of the Vclk must be raised, see step 160. The frequency of the Vclk must be raised as rapidly as possible, or the deterioration of usability such as flickers or disarrangement of display contents occurs.

Figure 2:
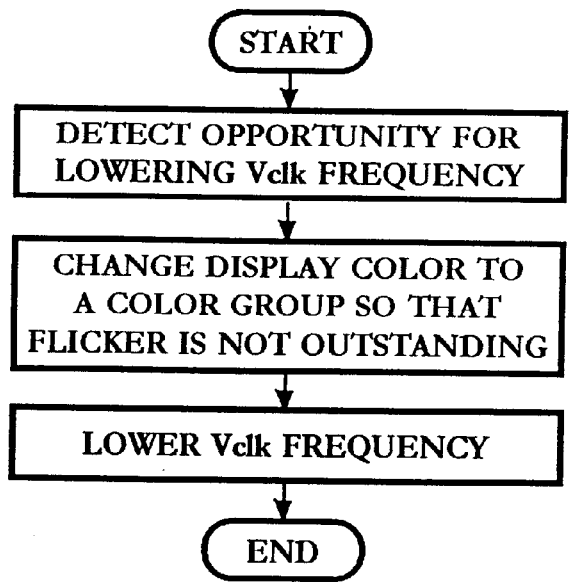
FIG. 2 detailed flowchart showing the process performed at step 130 in FIG. 1.

On the other hand, if the frequency of the Vclk is lowered, even of the frequency of the Vclk is not lowered so immediately, the usability will not be deteriorated. Therefore, by using this, a user is notified of lowering the frequency of the Vclk, see step 140. This is an optional step. This notification may be performed by displaying a pop-up window or by voice. A user may be notified not only that the frequency of the Vclk can be lowered, but also that the frequency can be further lowered by changing display colors so as to further reduce the power consumption. Flickers are caused by lowering the frequency of the Vclk, however, a person is not always sensitive to flickers in any colors of the display. There is a color combination at which a person is not perceptive to flickers. For example, if black and white or colors composed of a combination of the primary colors RGB (red, green and blue) that do not include half tones are used, flickers are rarely sensed by a person. In addition, if a color combination called high contrast (white) which is chosen in the screen design of Windows 95, is used, a user is rarely perceivable of flickers. Therefore, if colors of parts of a displayed window are changed to a combination of colors at which a user seldom perceive flickers, the frequency of the Vclk can be lowered further. The processing for changing colors is shown in FIG. 2. The change of colors may be performed without notifying a user; however, since a user may mistakenly regard the change as a malfunction, it is preferable that a notification be issued at least one time.

The process described in FIG. 2 can be performed independently. An opportunity to lower the frequency of Vclk in FIG. 2 can be a user instruction, that there is no user interaction for a predetermined period of time, that a screen has not been updated for a predetermined period of time, or that a currently focused window that is on a list of registration is moved to the background.

Then, the process for lowering the frequency of the Vclk is performed, see step 150. This process will be explained in detail later. It is checked whether the process has been terminated, see step 170. If the process has not been terminated, program control returns to step 110.

Opportunity to change the frequency of the Vclk in accordance with the names of the applications corresponding to windows has been explained. However, the present invention is not limited to only the opportunity described above. As another example opportunity, if window messages concerning a mouse or a keyboard (WM_KEYDOWN message or WM_LBOTTONDOWN message) are hooked so as to detect the frequency of the manipulation, and it is ascertained that the user is frequently manipulating the mouse or the keyboard, the frequency of the Vclk is maintained fast, while it is ascertained that the user is less frequently manipulating them, it is lowered. The events concerning the mouse or the keyboard can be monitored not only by using window messages but also by monitoring hardware interrupts at the device drive level.

A change in the size of windows that are registered as to be watched, such as the minimizing or the maximizing of the window, can be detected by monitoring the window message WM_SIZE. If a window to be watched is one for an application that displays motion pictures, when the window size becomes smaller than a predetermined size, the frequency of the Vclk may be lowered. In addition, if a window to be watched is one for an application such as a word processor, when the window size is maximized, the frequency of the Vclk may be lowered.

Furthermore, by examining the bitmap of the entire desktop screen or of an application window that is in the foreground, the frequency of the Vclk at which flickers do not occur can be set in accordance with the bitmap contents.

A Pentium (Trademark of Intel Corp.) processor includes an MSR (Model Specific Register), and from this register, the number of processor instructions executed or the number of I/O instructions executed is monitored. By monitoring the number of the instructions and the number of I/O instructions with the MSR, the contents of the processing, the execution condition and the load condition of the processor can be detected. If the number of instructions executed is small, accordingly, the number of drawing instructions executed is small, hence the frequency of the Vclk can be lowered. Therefore, by using the execution condition of the processor as an opportunity, the frequency of the Vclk can be lowered.

Before beginning an explanation of the process for lowering the frequency of the Vclk, see step 150, the configuration of a computer 1 will be described referring to FIG. 3. In the computer 1, a processor 3 and a video controller 7 are connected to a bus 5, which is driven at the speed of a bus clock (Bus CLK). The processor 3 may be connected to the bus 5 via peripheral circuits. The video controller 7, to which is transmitted an external base clock, is connected to a frame buffer 29 and an LVDS1 (low voltage differential signal 19). The LVDS1 (19) connected to the video controller 7 is in the transmitter side, and is connected to the receiver side of an LVDS2 (25). A PLL3 (21) is connected to the LVDS1 (19), while a PLL4 (23) is connected to the LVDS2 (25). The output of the LVDS2 (25) is connected to a gate driver 31 and a data driver 33, which drive an LCD panel 27. The LVDS1 and the LVDS2 can be replaced by similar devices, such as a PanelLink (trademark of Silicon Image Inc.), for transmitting serialized bit data of an image comprising pixels of a plurality of bits to the LCD panel 27.

The video controller 7 includes a PLL1 (9), a PLL2 (11), a bus interface 13, an LCD output circuit 17 and a controller 15. The PLL1 (9) supplies a memory clock Mclk to the controller 15, and the PLL2 (11) supplies a video clock Vclk to the LCD output circuit 17, so that the controller 15 is driven at the speed of the Mclk and the LCD output circuit 17 is driven at the speed of the Vclk. The bus interface 13 is driven at the speed of the bus clock. The bus interface 13 is connected to the controller 15, and the controller 15 is connected to the LCD output circuit 17.

The operation performed by the computer 1 is hereinafter described. The processor 1 transmits data and commands required for drawing via the bus 5 to the video controller 7. The bus interface 13 of the video controller 7 exchanges data with the bus 5 to supply data to be processed to the controller 15. The controller 15 reads from and writes to the frame buffer 29, performs the drawing operation, and controls the video controller 7. In order to periodically refresh the LCD panel 27, the controller 15 also outputs the contents of the frame buffer 29 to the LCD output circuit 17. The LCD output circuit 17 outputs RGB display data at the speed of the Vclk, and also a horizonal synchronization signal Hsync and a vertical synchronization sinal Vsync. For the EMI countermeasure, the LVDS1 (19), which is driven at the speed of the clock supplied by the PLL3 (21), converts RGB digital signals into individual RGB serial differential voltage signals, and transmits them to the LVDS2 (25). Upon receipt of these signals, the LVDS2 (25) outputs the RGB data to the data driver 33 at the speed of the Vclk, and also outputs the Hsync signal and the Vsync signal to the gate driver 31. In this process, the LVDS2 (25) employs a clock signal supplied by the PLL4 (23) to precisely receive the signals from the LVDS1 (19) and to output a signal at the speed of the Vclk.

The data driver 33, the gate driver 31 and the LCD panel 27 operate in the same fashion as they do normally. The gate driver 31 scans the LCD panel 27 for each gate line and the data driver 33 writes to pixels on the gate line, and hence writes data required as a whole to the LCD panel 27.

As described hereinbefore, the Vclk is employed for the LCD output circuit 17, the LVDS1 (19) and LVDS2 (25), and the data driver 33. With the configuration shown in FIG. 3, if the frequency of the Vclk is lowered, this affects the operations of the PLL3 (21) and the PLL4 (23) because the PLL3 (21) employs the Vclk, or a signal synchronized with the Vclk, for the oscillation of a clock. Especially if the oscillation of the PLL3 (21), connected to the LVDS1 (19), becomes unstable, this influences the following circuits. Unless the oscillation of the PLL3 (21) is stabilized, an image to be displayed is also affected.

Figure 4:
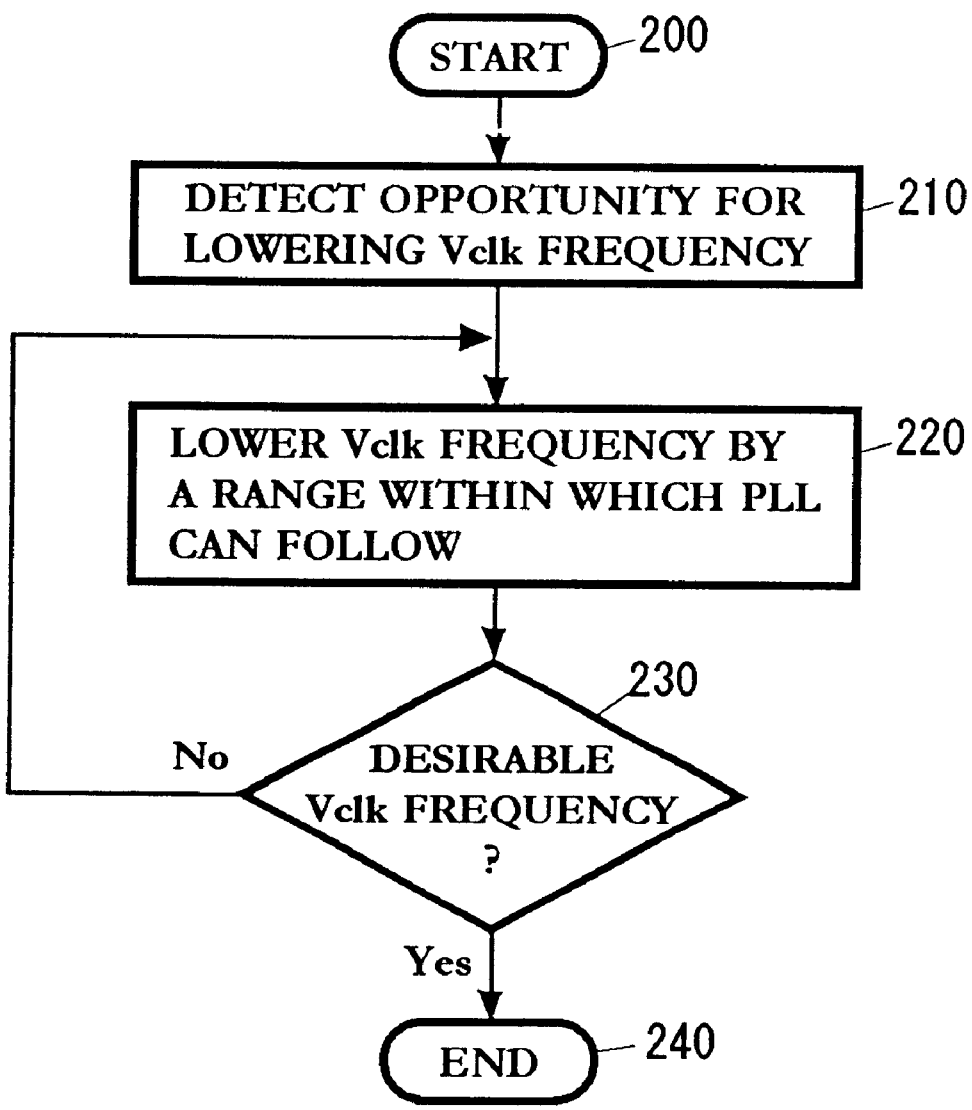
FIG. 4 is a detailed flowchart showing the process performed at step 140 in FIG. 1.

According to the present invention, therefore, the Vclk is gradually changed to a desired frequency while shifting a range within which the PLL3 (21) can follow the alteration. This process is shown in FIG. 4. As described above, after an opportunity to lower the frequency of the Vclk is detected, see step 210, the frequency of the Vclk is lowered by a difference within which the PLL3 (21) can follow the lowering (step 220). If, for example, the PLL can follow a maximum difference of 5%, at one time the frequency of the Vclk is lowered by a difference equal to or less than 5% of the frequency. This step 220 is performed one time for each frame, for example. The process is repeated until a desirable frequency of the Vclk is attained, see step 230. Steps 220 and 230 can be performed by software or by the controller 15.

Since the oscillation of the PLL3 (21) does not become unstable if above operation is performed, no disorderliness is transmitted to the circuits following the LVDS2 (23), display contents are not disarranged, and usability is not deteriorated. The frequency of the PLL is generally specified by three parameters: a numerator, a denominator and a frequency divider. If values near the current parameters are employed as values to be set next, it is possible to suppress instability of the PLL due to a difference in the timings at which individual parameters are loaded to a phase detector of the PLL circuit. Assuming that "numerator=15 and denominator=23" and the refresh rate is 60 Hz, it is preferable that, to change to a refresh rate of 59 Hz, "numerator=15 and denominator=22" be set as near-by values, rather than "numerator=30 and denominator=43."

Figure 3:
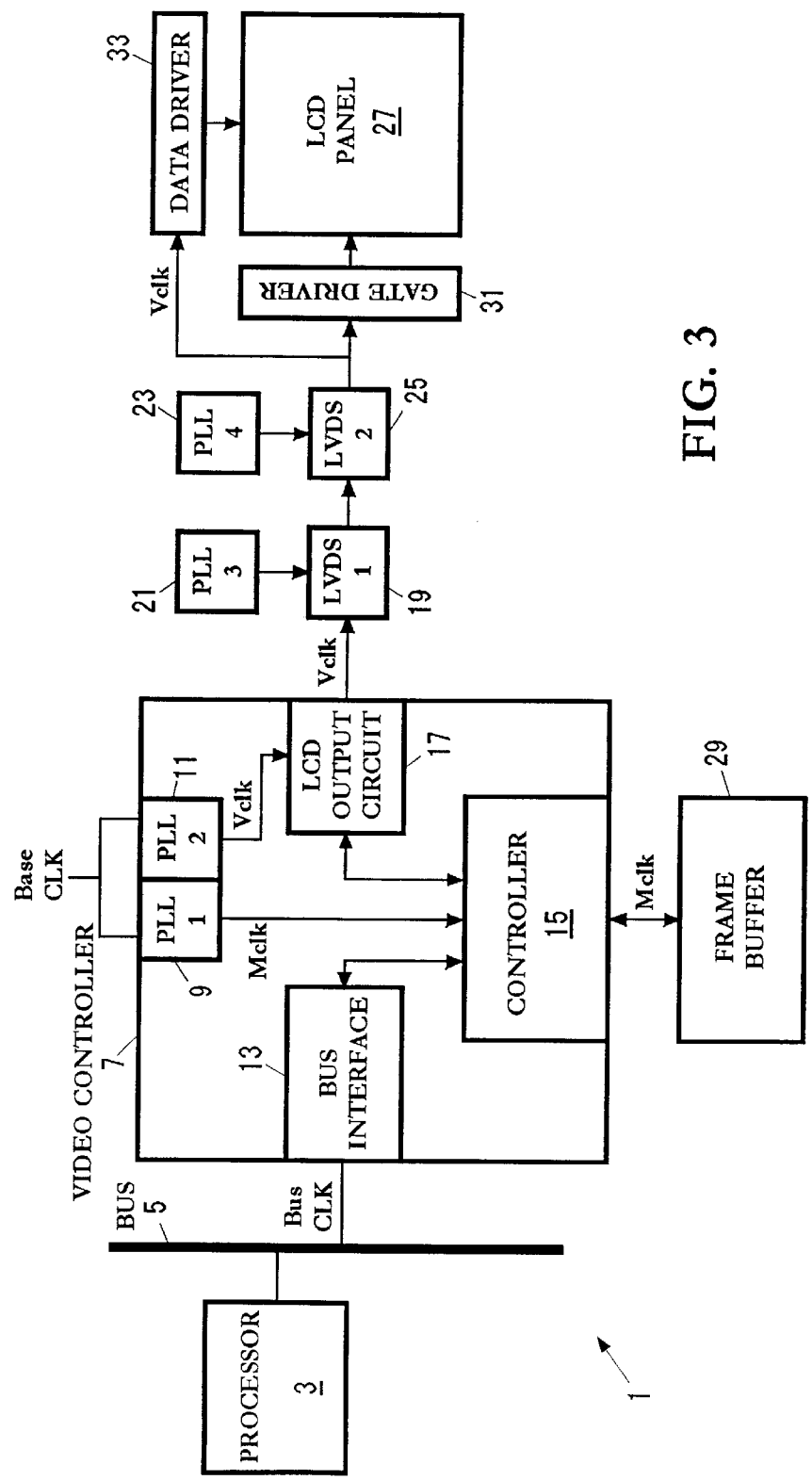
FIG. 3 is a diagram illustrating a first example configuration of a computer according to present invention.

The computer 3 shown in FIG. 3 is merely an example having a high resolution (e.g., XGA). For such a resolution, the Vclk is 65 MHZ and the Mclk is 84 MHZ.

Figure 5:
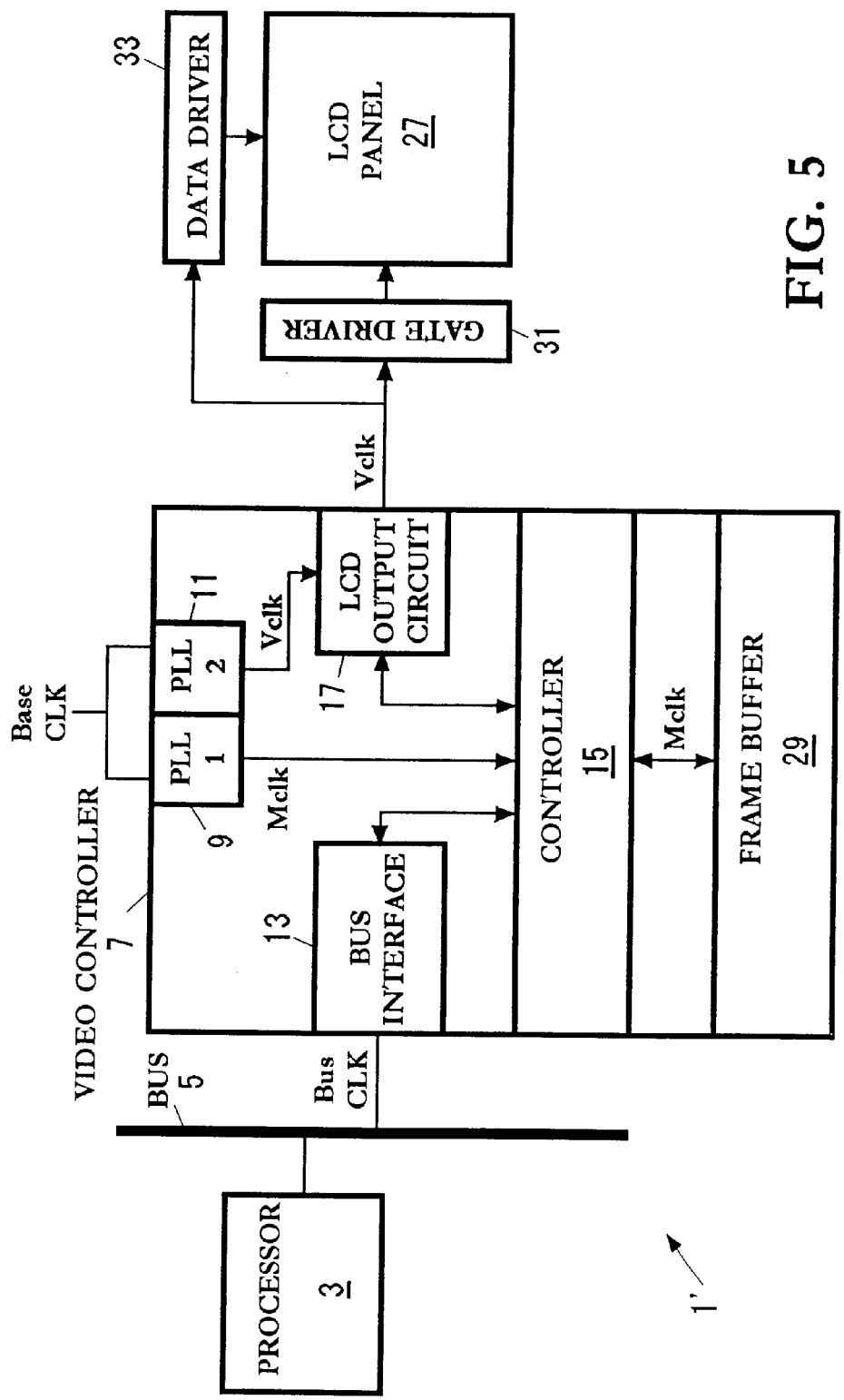
FIG. 5 is a diagram illustrating a second example configuration of a computer according to the principles of the present invention.

The circuits provided following the video controller 7 in the computer 1' can be designed as shown in FIG. 5. The same reference numbers as are used in FIG. 3 are also used in FIG. 5 to denote components having the same functions. In this example, the data for an LCD output circuit 17 are output to a data driver 33 and a gate driver 31. The output of the LCD output circuit 17 is performed at the speed of the Vclk. Another difference in the circuit from that in FIG. 3 is that a video controller 41 integrates a frame buffer 29, which is not a feature of the present invention. With this arrangement, the resolution is only as good as is provided by SVGA (800×600), which is not as high as that in FIG. 3, and Vclk=40 MHZ and Mclk=58 MHZ.

In the structure shown in FIG. 5, the RGB data in the LCD output circuit 17 are directly transmitted to the data driver 33, and the Hsync signal and the Vsync signal are directly output to the gate driver 31. With this configuration, no special care is required for the PLL of the LVDS. However, if the frequency of the Vclk is lowered while the data driver 33 and the gate driver 31 are performing a drawing process, the transmission of data from the controller 15 to the LCD output circuit 17 is disordered, and as a result, the display contents are disarranged. In the present invention, therefore, the Vclk is changed during the vertical blanking intervals. Since the Hsync signal and the Vsync signal are generated by dividing the frequency of the Vclk using a counter, they can follow the Vclk as long as the Vclk is gradually changed.

Figure 6:
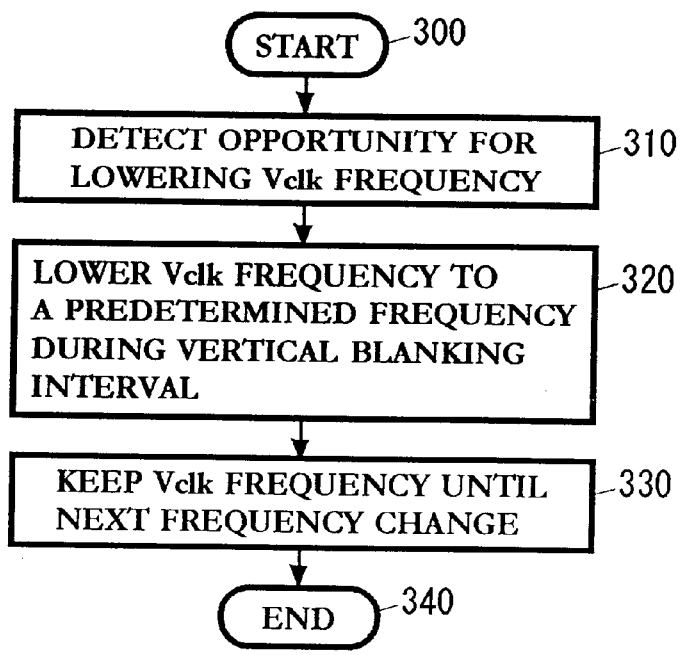
FIG. 6 is a detailed flowchart showing the process performed at step 140 in FIG. 1.

Specifically, if an opportunity to lower the frequency of the Vclk is detected, see step 310 as illustrated in FIG. 6, the frequency is not immediately lowered, instead, the vertical blanking interval is detected, and the frequency of the Vclk is lowered to a predetermined frequency during this period, see step 320. The frequency of the Vclk is kept until the next frequency change, see step 330. Steps 320 and 330 can be performed by software or by the controller 15.

Figure 7:
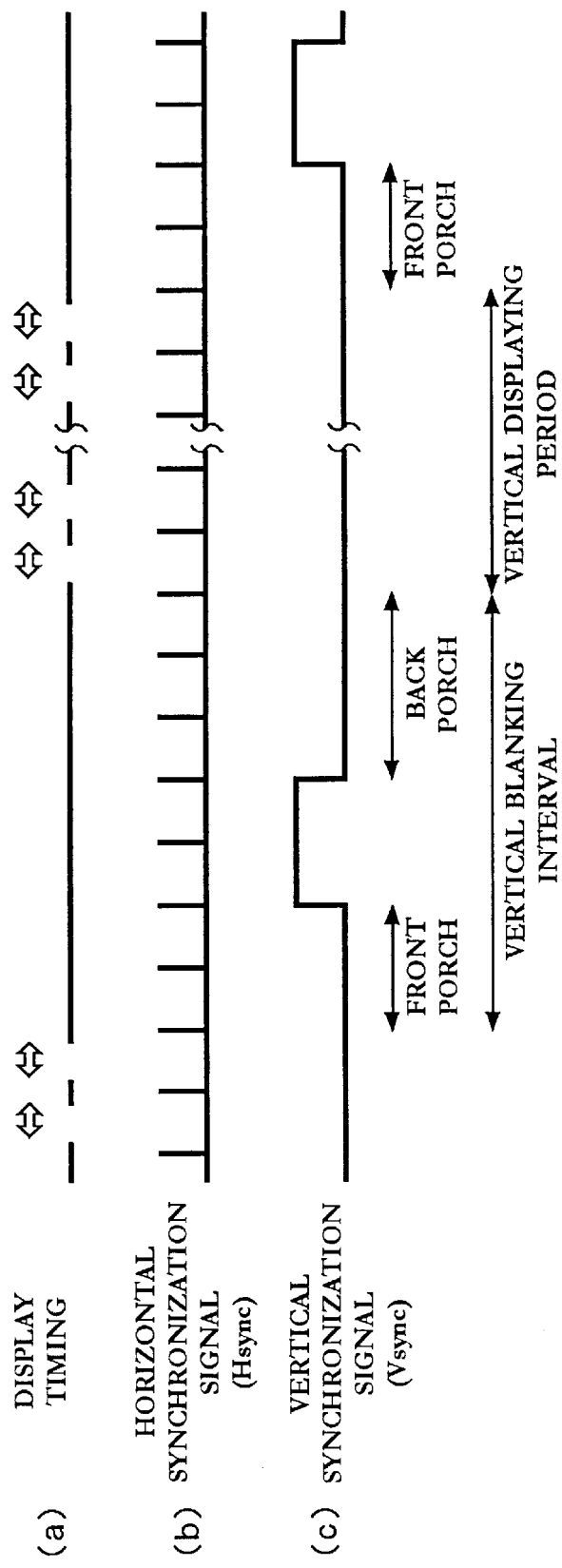
FIG. 7 is a timing chart for explaining a front porch and a back porch, with (a) showing a display timing, (b) showing a horizontal synchronization signal and (c) showing a vertical synchronization signal.

The process at step 320 is hereinafter explained in more detail. In the vertical blanking interval in FIG. 7, the portion before the Vsync signal is called a front porch and the portion after the Vsync signal is called a back porch. It is preferable that the frequency of the Vclk be changed in the front porch. Since only the timing of the Vsync signal may be obtained if software is used to change the frequency, the frequency of the Vclk may be changed in the back porch without the Hsync signal being affected. If the controller 15 or another circuit is employed to change the frequency, detection of the signal timings is always possible.

As described hereinbefore, the frequency of the Vclk is lower than that of the Mclk, which is determined by adding a bandwidth (frequency) required for the Vclk to a bandwidth required for refreshing the frame buffer and the processor and the video controller. If the frequency of the Vclk is lowered, a margin is generated for the Mclk. This margin can be distributed to the processor and the video controller; however, since drawing is infrequently performed in a period during which the frequency of the Vclk is being lowered, the frequency of the Mclk can be lowered by a width that is equivalent to the lowering of the frequency of the Vclk. In addition, since the drawing is infrequently performed during that period, the frequency of the Mclk can be lowered more than can the frequency of the Vclk.

Without further analysis, the foregoing provides sufficient information regarding the present invention that others can, by applying current knowledge, readily adapt it for various applications without omitting presented features that from the standpoint of prior art, fairly constitute essential characteristics of the generic or specific aspects of the present invention, and provide for advantages which include the frequency of the video clock can be changed without the display quality being affected, and that according to the principles of the present invention, the power consumption can be reduced.

What is claimed:

1. A method for use with a computer display system having an LCD display with a driver having a phase lock loop timed by a video clock of adjustable frequency, said method comprising the steps of:

detecting an opportunity which is preselected to initiate a reduction of the frequency of the video clock;

lowering the frequency of the video clock in a frequency increment selected to be within a range for which the phase-lock circuit employing the video clock can follow such change in the frequency without loss of stability; and iterating the step of lowering the frequency of the video clock, at least once, until a predetermined frequency is attained.

2. The method according to claim 1, wherein the opportunity which causes the reduction of the video clock is detected in accordance with the type of application whose window is displayed on a screen of the LCD display device.

3. The method of claim 1 wherein said frequency increments are selected to be less than 5% of the video clock frequency whereby destabilization of the phase lock loop is avoided.

4. A computer having a LCD display device and a driver which provides an interval between display refreshes and includes a phase-lock circuit which responds to a video clock signal having an adjustable frequency, comprising:

signal logic for detecting an operating system execution of certain preselected application programs known to present opportunities for low video activity and signaling such low video activity opportunities; and a controller for lowering the frequency of the video clock to a predetermined frequency during said interval in multiple sub-increments of frequency of a size selected to allow the phase-lock circuit to follow without destabilizing, and for maintaining the predetermined frequency of the video clock until said signal logic signals a change of video activity.

5. The computer of claim 4 wherein said sub-increments are of a size less than 5% of the video clock frequency.

* * * * *